US006886547B2

United States Patent
Butler, Jr.

(10) Patent No.: US 6,886,547 B2
(45) Date of Patent: May 3, 2005

(54) IGNITION SYSTEM WITH MULTIPLEXED COMBUSTION SIGNALS

(75) Inventor: Raymond O. Butler, Jr., Anderson, IN (US)

(73) Assignee: Delphi Technologies, Inc., Troy, MI (US)

( * ) Notice: Subject to any disclaimer, the term of this patent is extended or adjusted under 35 U.S.C. 154(b) by 106 days.

(21) Appl. No.: 10/647,868

(22) Filed: Aug. 25, 2003

(65) Prior Publication Data

US 2004/0035404 A1 Feb. 26, 2004

Related U.S. Application Data

(63) Continuation-in-part of application No. 10/091,247, filed on Mar. 4, 2002, now Pat. No. 6,615,811.

(51) Int. Cl.[7] .................................................. F02P 3/04
(52) U.S. Cl. ........................ 123/606; 73/35.08; 123/625
(58) Field of Search ................................. 123/606, 625; 73/35.08

(56) References Cited

U.S. PATENT DOCUMENTS

| 4,444,172 | A | * | 4/1984 | Sellmaier et al. | .......... 73/35.08 |
|---|---|---|---|---|---|
| 5,675,072 | A | | 10/1997 | Yasuda et al. | ............. 73/35.08 |
| 5,676,113 | A | | 10/1997 | Johansson et al. | .......... 123/425 |
| 5,694,900 | A | | 12/1997 | Morita et al. | ................ 123/425 |
| 5,769,049 | A | | 6/1998 | Nytomt et al. | .............. 123/435 |
| 5,775,298 | A | | 7/1998 | Haller | ........................ 123/425 |
| 5,803,047 | A | | 9/1998 | Rask | .......................... 123/425 |
| 5,814,994 | A | | 9/1998 | Hohner et al. | .............. 324/380 |
| 5,866,808 | A | | 2/1999 | Ooyabu et al. | ............... 73/116 |
| 6,246,952 | B1 | * | 6/2001 | Honda | ....................... 73/35.08 |
| 6,359,439 | B1 | | 3/2002 | Crecelius et al. | |
| 6,367,318 | B1 | | 4/2002 | Boyer et al. | |
| 6,378,513 | B1 | | 4/2002 | Boyer et al. | |
| 6,450,157 | B1 | | 9/2002 | Kesler et al. | |
| 6,615,811 | B1 | * | 9/2003 | Butler, Jr. | .................... 123/606 |
| 6,739,181 | B2 | * | 5/2004 | Honda | ....................... 73/35.08 |

* cited by examiner

Primary Examiner—Erick Solis
(74) Attorney, Agent, or Firm—Jimmy L. Funke (57) ABSTRACT

A plurality of ignition coils having a combustion detection capability, such as an ion sense capability or cylinder pressure detection capability, are connected to a common communication line. The combustion signals for the plurality of ignition coils is multiplexed on the common communication line. The combustion signal for each ignition coil/cylinder is applied to the common line combined with a respective sync signal such as a current flag signal or a respective electronic spark timing (EST) signal. The sync signals allow each ignition coil to determine when it can transmit its combustion signal.

12 Claims, 6 Drawing Sheets

IGNITION SYSTEM WITH MULTIPLEXED COMBUSTION SIGNALS

RELATED APPLICATIONS

This is a continuation-in-part (CIP) of U.S. application Ser. No. 10/091,247 filed Mar. 4, 2002 now U.S. Pat. No. 6,615,811 entitled "IGNITION COIL INTEGRATED ION SENSE WITH COMBUSTION AND KNOCK OUTPUTS," hereby incorporated by reference in its entirety.

TECHNICAL FIELD

The invention relates generally to an ignition system for an internal combustion engine, and, more particularly, to an ignition system having multiplexed combustion signals.

DESCRIPTION OF THE RELATED ART

One approach for determining a level of combustion in an internal combustion engine involves the use of a so-called ion sense system. It is known that the combustion of an air/fuel mixture in an engine results in molecules in the cylinder being ionized. It is further known to apply a relatively high voltage across, for example, the electrodes of a spark plug just after the ignition operation to produce a current across the electrodes. Such current is known as ion current. The ion current that flows is proportional to the number of combustion ions present in the area of, for example, the spark plug gap referred to above, and is consequently indicative of the ionization throughout the entire cylinder as combustion occurs. The DC level or amount of ion current is indicative of the quantity of the combustion event, or whether in fact combustion has occurred at all (e.g., a misfire condition). An AC level of the ion current may also be used to determine whether knock exists. The ion sense approach is effective for any number of cylinder engines and various engine speed and load combinations. Thus, the ion current signal defines one kind of combustion signal.

Another approach for producing a combustion signal involves the use of a cylinder pressure sensor. While there are a variety of approaches, the pressure signal defines another kind of combustion signal. How the pressure signal correlates to the combustion event is understood in the art.

One problem with the ion sense or cylinder pressure approaches is that each generally requires a separate line between the ignition coil and a controller, for example, an engine control computer. Conventional ignition systems are thus plagued with a proliferation of control, data, and timing lines to the control unit. It would be desirable to reduce such connections to improve reliability and/or reduce cost.

Although not prior art, commonly owned U.S. application Ser. No. 10/091,247 filed Mar. 4, 2002 (DP-304,842) discloses multiple ion current signals multiplexed on a single line, and multiple pulse width modulated (PWM) combustion signals multiplexed on a single line.

There is therefore a need to provide an ignition system that minimizes or eliminates one or more of the shortcomings as set forth above.

SUMMARY OF THE INVENTION

One object of the present invention is to provide a solution to one or more of the above-identified problems. One advantage of the invention is that it reduces the number of wires required to connect such an ignition system to a control unit, such as an engine control unit.

A method is provided for operating a plurality of ignition coils in a multi-cylinder internal combustion engine. The method includes five basic steps. The first step involves initiating combustion in a first cylinder using a first one of the ignition coils. Next, generating a first combustion signal indicative of combustion occurring in the first cylinder. The first combustion signal is generated on a common communication line. Third, initiating combustion in a second cylinder using a second one of the ignition coils. Fourth, generating a second combustion signal associated with the second cylinder on the common communication line in a time multiplexed fashion. The foregoing steps multiplex a plurality of combustion signals on the common line, thereby reducing structure and cost, while increasing reliability. In a preferred embodiment, a fifth step provides a mechanism that allows identification of the combustion signal by the various ignition coils. In particular, a sync signal is preferably provided, which may be either a current flag signal or an electronic spark timing (i.e., dwell) signal in alternate embodiments. The current flag or EST signal provides a way for the various ignition coils in the ignition system to know when it is their time to generate the combustion signal.

Other objects, features, and advantages of the present invention will become apparent to one skilled in the art from the following detailed description and accompanying drawings illustrating features of this invention by way of example, but not by way of limitation.

BRIEF DESCRIPTION OF THE DRAWINGS

The present invention will now be described by way of example, with reference to the accompanying drawings.

FIGS. 3A–3L and 4A–4L are simplified timing diagrams of various signals present in, and output from, the ignition system of FIG. 2.

FIGS. 6A–6I are simplified timing diagrams of various signals present in, and output from, the ignition system of FIG. 5.

DETAILED DESCRIPTION OF THE PREFERRED EMBODIMENTS

Figure 1:
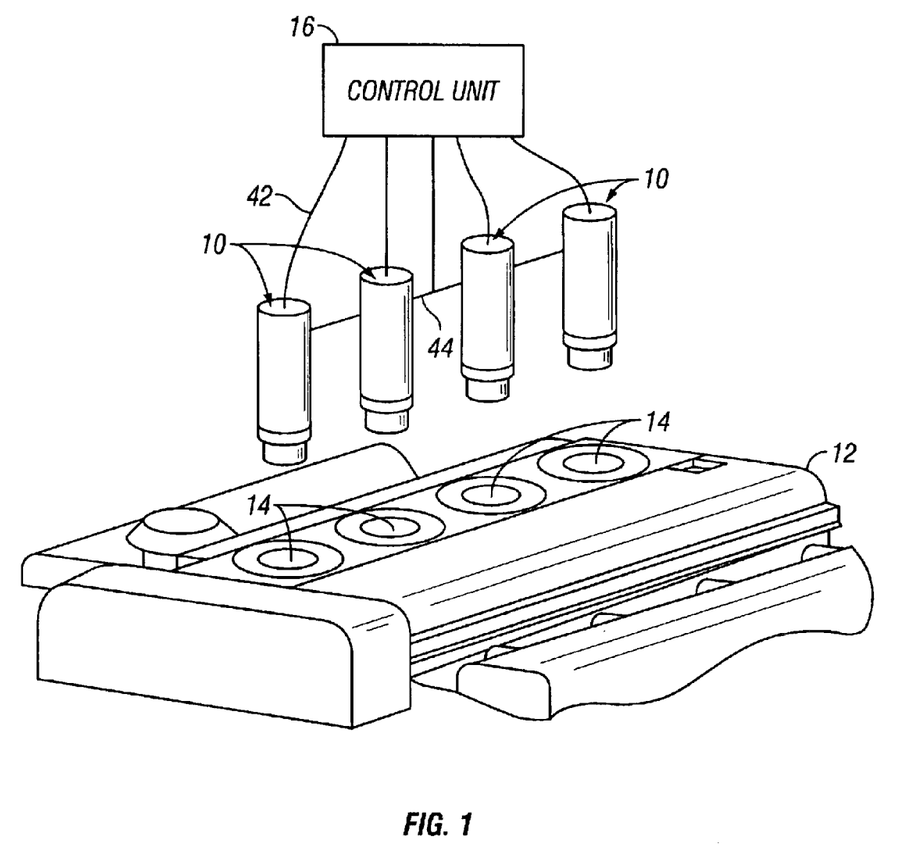
FIG. 1 is a simplified diagrammatic view of an ignition system according to the invention.

Referring now to the drawings wherein like reference numerals are used to identify identical components in the various views, FIG. 1 shows a preferred embodiment of an integrated ignition apparatus or coil 10 having the capability to detect combustion (i.e., the level of combustion and/or the nature and quality of the combustion) and generate a corresponding combustion signal. Two embodiments are presented herein, namely, an embodiment wherein an ion sense subsystem is provided, and another embodiment wherein a cylinder pressure detection subsystem is provided. Of course, other approaches to combustion detection are possible and are within the spirit and scope of the present invention.

Each coil 10 is adapted for installation to a conventional internal combustion engine 12 by way of a spark plug in threaded engagement with a respective spark plug opening 14. The spark plug opening leads into a combustion cylinder.

Generally, overall spark timing (dwell control) and the like is provided by a control unit 16. In the illustrated embodiment, one ignition coil is provided per spark plug, although other arrangements are known, and are possible within the scope of the invention. The plurality of ignition coils 10, in the illustrated embodiment, each have a respective dwell control line coupled to control unit 16. In FIG. 1, one of these lines is designated 42. According to the invention, one common, physical communication line 44 is configured to carry the plurality of combustion signals generated by the plurality of ignition coils. This feature reduces structure and cost, while improving reliability.

Figure 2:
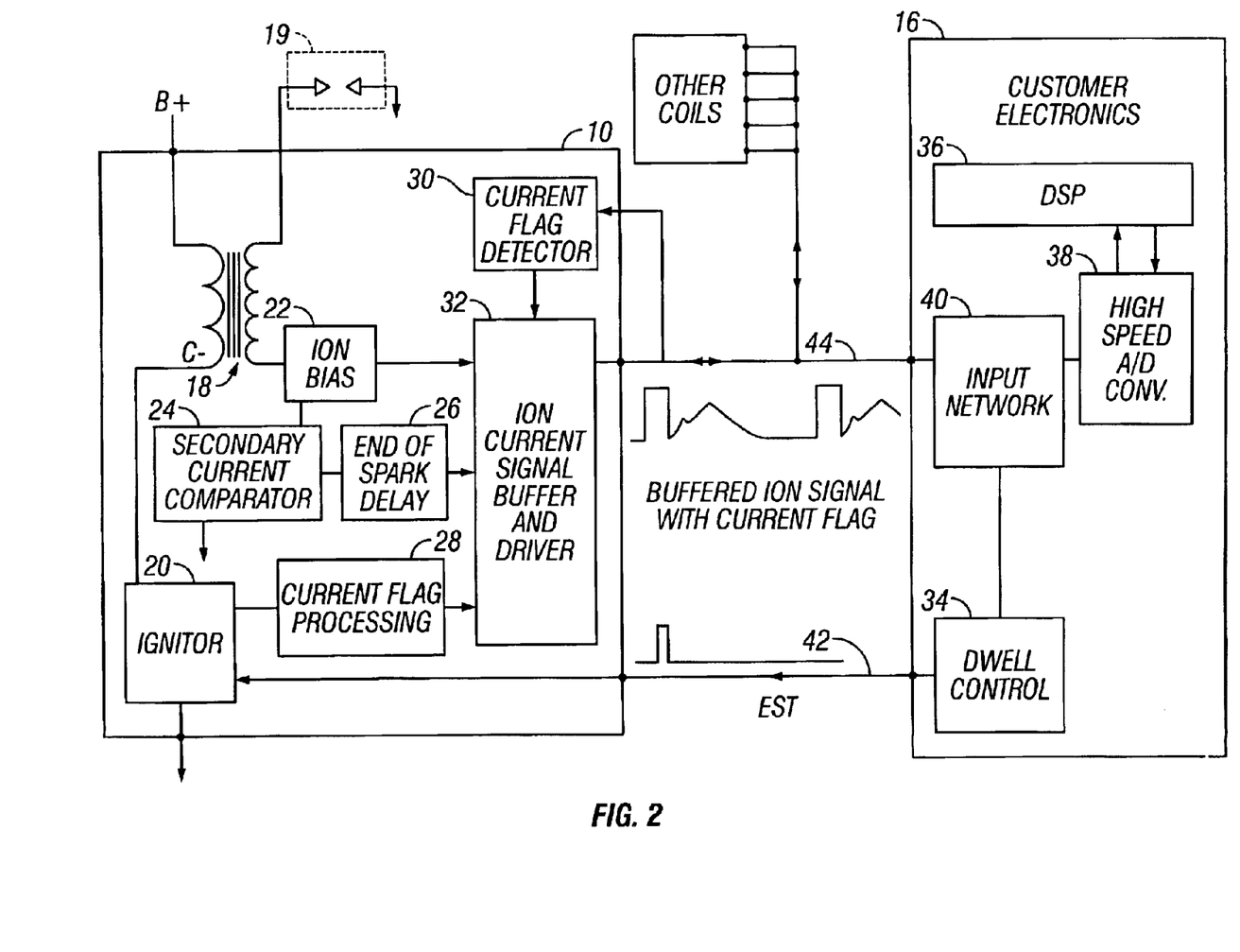
FIG. 2 is simplified block diagram view showing, in greater detail, one of the ignition coils and the control unit of FIG. 1.

FIG. 2 shows in greater detail the plurality of ignition coils 10 and control unit 16 of FIG. 1. Ignition coil 10 is shown having a high-voltage transformer portion 18 coupled to a spark plug 19, an ignitor block 20, an ion bias block 22, a secondary current comparator block 24, an end of spark delay block 26, a current flag processing block 28, a current flag detector 30, and an ion current signal buffer and driver block 32.

With reference to ignition coil 10, transformer portion 18 includes a primary and a secondary winding and may be configured to function as an inductive ignition coil. One end, such as the high side end, of the primary winding is shown connected to a supply voltage provided by a power supply, such as a vehicle battery (not shown), hereinafter designated "B+" in the drawings. Supply voltage B+ may nominally be approximately 12 volts. A second end of the primary winding opposite the high side end is connected to ignitor block 20. A first end of the secondary winding on which the spark voltage is produced is coupled to spark plug 19. A second end of the secondary winding opposite the first end is connected to a ground node through block 22 and block 24. The primary and secondary windings are matched in a predetermined manner known in the art.

Spark plug 19 is disposed in engine 12 proximate a combustion cylinder thereof, as known, and is configured to produce a spark across a gap defined by spaced electrodes. The spark event, as is generally understood by those of ordinary skill in the art, is provided to ignite an air and fuel mixture introduced into the cylinder. During the spark event, a spark current flows across the plug electrodes. In addition, spark plug 19 is configured so that when biased by an ion bias voltage produced by block 22 (after sparking has been discontinued and the end-of-spark ring out delay has elapsed), an ion current may be carried across the spaced electrodes. The magnitude of a DC component of the ion current is generally indicative of a combustion condition, such as combustion, and/or misfire. In general, the greater the ion current (i.e., due to more ionized molecules present in the cylinder), the more complete the combustion. In addition, the presence of an AC component of the ion current may be indicative of a knock condition. For example only, (1) a first knock mode may be defined based on the magnitude of the AC component of the ion current in a range between approximately 5–6 kHz while (2) a second knock mode may be defined based on the magnitude of the AC component of the ion current in a range between approximately 10–12 kHz. Other uses of ion current combustion signal are known in the art.

Ignitor block 20 is configured to selectively connect the primary winding to ground, based on the EST signal. Such connection, as is known generally in the art, will cause a primary current $I_P$ to flow through the primary winding. Block 20 may comprise conventional components known to those of ordinary skill in the art, for example, a bipolar transistor, a MOSFET transistor, or an insulated gate bipolar transistor (IGBT). Block 20 may be further configured, as known in the art but not shown, to control transformer 18 so as to apply repetitive sparks to the combustion chamber during a single combustion event, commonly referred to as multicharge operation (i.e., for the multiple charging/discharging cycles of transformer 18).

The EST signal is generated by dwell control block 34 of control unit 16 in accordance with known strategies, based on a plurality of engine operating parameters, as well as other inputs. Dwell control block 34 generally involves the control of the timing of the initiation of the spark event (i.e., at a crankshaft position in degrees relative to a top dead center position of a piston in the cylinder) as well as a duration. The asserted ignition control signal EST is the command to commence charging of the ignition coil 10 for a spark event. Block 20, in response thereto, causes a switch or the like to conduct, wherein the primary current $I_P$ flows through the primary winding. The EST signal is applied, in the illustrated embodiment, as a positive-going pulse having a duration corresponding to a desired primary ignition coil charge time. Charging commences at the time of receipt by ignitor block 20 of a rising (positive going) edge of the EST signal. Upon receipt of a falling (negative going) edge of the EST signal, block 20 causes an interruption in the primary current $I_P$. It is well understood by those of ordinary skill in the art of ignition control that such interruption results in a relatively high voltage being immediately established across the secondary winding, due to the collapsing magnetic fields associated with the interruption of the primary current. The secondary voltage will continue to rise until reaching a break down voltage across the spaced electrodes of spark plug 19. Current will thereafter discharge across the gap (i.e., spark current), as is generally understood in the art. In a multicharge embodiment (not shown), block 20 continues recharging and discharging to produce further sparks. After sparking ends and the end-of-spark ring out delay has elapsed, ion bias block 22 is configured to generate a bias voltage to start ion sensing.

Block 22 is configured to perform multiple functions. First, block 22 is configured to establish a bias voltage across spaced electrodes for causing an ion current to flow. The structure for performing this function may include any one of a plurality of approaches known in the art. For example, one embodiment may employ a zener diode in parallel with a storage capacitor; however, this is exemplary and not limiting in nature. Block 22 is further configured to provide the means for sensing the ion current and for generating in response thereto an ion current signal, which is provided to block 32. Third, block 22 is configured to determine when to open and close a combustion window (shown and described below) for accurately determining a combustion condition. Block 32 is configured to convert the ion current signal into a combustion signal indicative of the level or quantity of combustion during the combustion window. The combustion signal is output on common communications line 44.

Secondary current comparator block 24 is configured to determine when a secondary current has decayed from its maximum, initial level (i.e., most negative) to a predetermined threshold level. In the described and illustrated embodiment, this predetermined threshold level is about zero amperes. Block 24 may comprise conventional components known to those of ordinary skill in the art in order to implement the described function.

End-of-spark-delay block 26 is configured, in one embodiment, to provide a fixed delay. Such fixed delay commences after the detection of the time when the secondary currents meets the secondary current threshold, as described above in connection with block 24. A signal indicative of when this delay has elapsed is provided to block 32, as shown. Block 26 may comprise conventional components known to those of ordinary skill in the art to implement the described function.

Current flag processing block 28 is configured to generate a signal indicative of the current, preferably the primary current, through the primary winding of transformer portion 18. In a known system of the type that uses a main dwell signal (i.e., that defines coil charge initiation and spark timing) it is also known to use a so-called current flag as feedback for dwell control. Such current flag may be generated by the ignition coil when the primary current in the ignition coil reaches a predetermined level. In one embodiment, current flag processing block 28 is configured to determine when the primary current has increased from zero to reach a predetermined threshold, and to generate a current flag signal (i.e., in the form of a pulse) in response thereto. A pair of exemplary current flag signals are illustrated in the series of FIGS. 3E–3F and FIGS. 4E–4F. The current flag signal so generated is then fed to the ion current signal buffer and driver block 32 for further processing. Block 28 may comprise conventional components known to those of ordinary skill in the art to implement the described function.

Figure 3A:
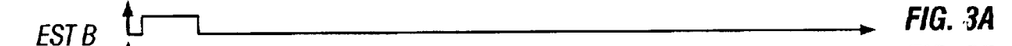
Figure 3B:
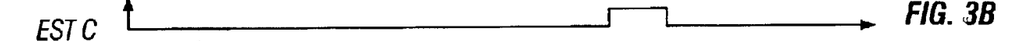
Figure 3C:
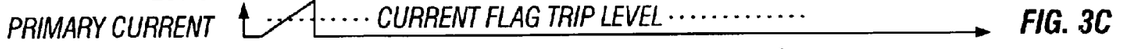
Figures 3D, 3E:
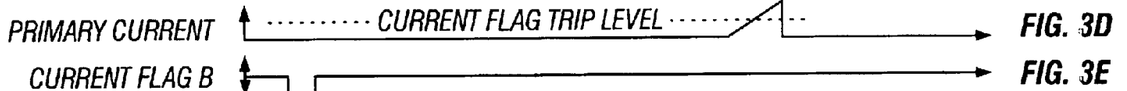

Current flag detector block 30 is configured to detect occurrences of the current flag signal on common communication line 44 and to coordinate the timed generation of a combustion signal combined with the current flag, for the associated ignition coil, on line 44. That is, the ignition coils, sharing a common communication line 44, must each know when it can transmit on the line 44. Each coil 10 makes this determination using the current flag detector 30, which provides an output enabled signal to buffer and driver block 32. In a preferred embodiment, the current flag signal for a particular ignition coil (e.g., as shown in FIG. 3E for cylinder B or FIG. 3F for cylinder C) is modified to form a sync signal (e.g., as shown in FIG. 3K). It is referred to as a sync signal because it can be used to control when each ignition coil drives line 44. Block 30 is preferably configured to detect this sync signal appearing on line 44 so as to know when it can produce its own "sync" signal/combustion signal. Block 30 may be configured to detect when a predetermined voltage level is present for a predetermined time (i.e., corresponding to the sync signal).

That is, any particular coil knows when it is active due to the receipt of its EST signal as well as the internal generation of the current flag by current flag processing block 28. However, when block 30 detects the next and subsequent sync signals, it knows it should not drive the common line 44.

Buffer and driver block 32 is configured to generate the combustion signal (i.e., ion signal in the embodiment of FIG. 2), as provided by ion bias block 22, in timed relation with the end of spark delay, as provided by block 26, combined with a sync signal, which may be the current flag signal in original or modified form, as provided by block 28, when enabled by detector block 30. Block 32 may comprise conventional components known to those of ordinary skill in the art to implement the described function.

Control unit 16 is shown having a dwell control block 34, a Digital Signal Processor (DSP) block 36, an analog-to-digital (A/D) converter block 38, and an input network block 40. In the illustrated embodiment, various signals/signal lines are coupled between ignition coil 10 and control unit 16, including an electronic spark timing (EST) signal for dwell control on line 42, and a combined current flag signal/combustion signal for each ignition coil 10, time multiplexed on line 44. Line 44 is a common shared line between and among the ignition coils 10 and control unit 16.

Control unit 16 may comprise an engine controller or Electronic Control Unit (ECU). The DSP 36, memory, and input/output are all operating according to preprogrammed strategies. The strategies enable control unit 16 to perform various functions related to at least engine control. For example, control unit 16, in addition to spark control, also controls fuel delivery, air control and the like. In a global sense, control unit 16 is configured to control overall combustion in the engine.

DSP 36 of control unit 16 analyzes the combustion signal provided by ignition coil 10 and may use the information extracted from such analysis to make adjustments in the control of spark, fuel delivery, air and the like in order to improve combustion, according to known strategies. Depending on the degree of misfire (or combustion), adjustments in fewer than all or even only one of the above parameters may be necessary. In addition, regulations exist that require detection of misfire. The art is replete with strategies for combating incomplete combustion and/or misfire.

Converter block 38 is provided to convert analog information (e.g., either or both of the timing information or combustion signal (raw or processed form)) into a form suitable for processing by DSP 36.

Input network 40 is configured to receive the various combustion signals from the various ignition coils 10, and provided the output to both converter block 38 and dwell control block 34. In a preferred embodiment, the combustion signal position may be directed to converter block 38 while the current flag portion may be directed to the dwell control block 34 for closed loop dwell control. Network 40 may also contain processing circuitry for analyzing the combustion signal (i.e., the ion current signal) from each ignition coil. For example only, network 40 may contain an integration block (not shown) for integrating the ion signal, as known. Alternatively, the combustion signal may be passed by network 40 directly to converter block 38, wherein the DSP 36 integrates the ion current signal in the digital domain.

FIGS. 3A–3L are timing diagrams for various signals in the ignition system of FIG. 2. It is generally desirable to examine the combustion signal, for example the ion current signal, over the longest possible time. This is to obtain more comprehensive and thus better information regarding the combustion process. However, there are intervals where the ion current signal is not directly indicative of the level of combustion, for example, during the spark event itself and the subsequent ring out. To consider the magnitude of the ion current signal during these internals may cause errors. Therefore, the level of combustion (or misfire) is preferably determined by analyzing the ion current only during a so-called combustion window.

Conventional systems open the combustion window (i.e., begin processing of the ion current signal) only after a fixed delay has elapsed after the beginning of the initial spark, which delay must be conservatively chosen to be sufficiently long so as to cover the longest case scenario. This prolonged fixed delay, however, results in delaying the opening of the combustion window in many instances where the window could be opened up earlier. Thus, useful information may be effectively ignored. In the system shown in FIG. 2, the overall delay between the initial spark and the opening of the combustion window is variable and is divided into two parts: a variable part and a fixed part (which together is variable). The variable part is defined by determining when the secondary winding current has decayed to about zero milliamps as determined by comparator block 24 in FIG. 2. This interval is variable since the secondary current discharge rate is influenced by many factors, as known in the art. For example, temperature (i.e., affects coil and wiring resistances), engine speed (i.e., affects flow in the cylinder) and the like. The fixed part is configured to cover the period of time that it takes the secondary current to ring out, and is substantially constant under most operating conditions. A fixed delay is therefore selected, and is herein referred to as the end-of-spark ring out delay, which delay is implemented in delay block 26.

Assume that engine 12 is a four-cylinder engine having cylinders with a firing order of A–B–C–D. FIG. 3A shows an electronic spark timing (EST) B signal associated with cylinder B, which is generated by control unit 16. FIG. 3B shows an EST C signal associated with cylinder C, the next in the firing order. The EST B signal, on the rising edge, commences the flow of a primary current through ignition coil 10. The primary current is shown in FIGS. 3C and 3D for cylinders B and C. When the time for producing a spark occurs, control unit 16 deasserts the EST B signal, shown as a falling edge in FIG. 3A, which operates to interrupt the primary current. This interruption is shown in FIG. 3C for cylinder B and FIG. 3D for cylinder C as the respective primary currents drop to zero. Interruption of the primary current results in a high voltage being established across the secondary winding, which results in a secondary current in the secondary winding after the gap breakdown (i.e., spark). The secondary current for cylinder B is shown in FIG. 3G. The ignition coil 10 then waits a variable time after the initial spark by determining when the secondary current has discharged to a preselected level (using block 24). In a non multicharge embodiment, the preselected level is about zero milliamps. In a multicharge mode, the preselected level may be non-zero, as it may be desired to avoid allowing the secondary to decay all the way to zero. The end-of-spark ring out delay, however, is substantially fixed, and is determined by delay block 26.

After the end-of-spark delay, the combustion window for Cylinder B, which is shown in FIG. 3I, is opened. Thereafter, an ionization level is detected using the ion current signal. Significantly, the combustion window is opened as soon as possible, thereby providing the capability of processing the ion current signal for a longer period of time. This early-opening of the combustion window results in obtaining better information. Note that a negative-going spike 43 (FIG. 3J) in the ion current signal for cylinder B, which is not indicative of the level of combustion in cylinder B, is ignored (i.e., the spike is outside of the combustion window). This result is shown in FIG. 3K, which is a buffered (i.e., inverted) and "windowed" (i.e., gated with the combustion window) ion current signal. This selectivity minimizes errors in the output combustion signal.

Figure 3F:
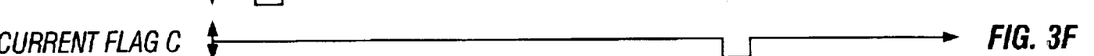
Figure 3J:
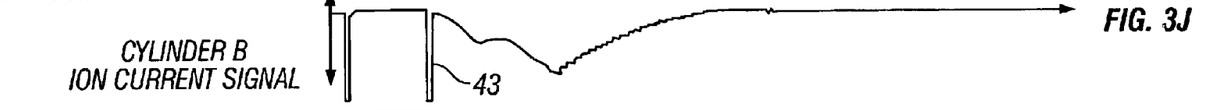

While the end-of-spark processing above pertains to the opening of the combustion window, the closing of the combustion window will now be addressed. The window is maintained open for the longest period of time possible, being closed only when the spark plug for the next cylinder is ready to be fired. FIG. 3B shows the EST C signal as mentioned above. Cylinder B and cylinder C each have a separate ignition coil 10 associated therewith. A current flag signal is generated, in a preferred embodiment, with respect to each ignition coil 10. The current flag signal for each cylinder, as best shown in FIGS. 3E and 3F, is generated when the primary current through the ignition coil 10 for that cylinder meets predetermined criteria. For example, only the current flag signal may transition high-to-low when the primary current meets a charging current trip level and then may transition low-to-high substantially coincident with the fall of the EST signal. The result is a high-low-high pulse, in the illustrated embodiment.

The combustion window for a cylinder just undergoing combustion (e.g., cylinder B) is closed as a function of the current flag signal associated with another cylinder (e.g., cylinder C), preferably the next cylinder in the engine firing order. In the illustrated embodiment, the combustion window is coordinated to close in timed relationship with the first edge (e.g., falling edge) of the current flag signal for the next cylinder in the firing order as shown in FIG. 3F, although it could alternately be the second edge of the current flag signal for the next cylinder. By delaying the closing of the window to the last possible time (i.e., when the plug for the next cylinder is about to be fired), more information is collected via processing of the ion current signal, improving the assessment of combustion and/or misfire. FIG. 3H shows the subsequent secondary current for the next to fire cylinder C.

FIG. 3K shows the output of buffer and driver block 32 for cylinder B. A first sync signal in the form of a modified current flag signal, designated 45, is shown at the beginning of the waveform. The modified current flag signal 45 has a leading edge synchronized with the leading edge of the original current flag signal for cylinder B shown in FIG. 3E. The modified current flag signal 45 is also shown having a trailing edge synchronized with the expiration of the end-of-spark ring out delay interval, which also coincides with the opening of the combustion determination window (FIG. 3I). FIG. 3K also shows that the modified current flag signal is generated in a substantially continuous, prefix, fashion with the ion current signal.

FIG. 3K shows the activity on common communication line 44, wherein transmissions from each of the ignition coils 10 in the ignition system are time multiplexed. In particular, FIG. 3L shows the ion current signal with respective first and second sync signals (i.e., the modified current flag signals) for each of cylinder B and cylinder C.

As mentioned above, the current flag signal, and hence the sync signals since they are based on the current flag signals, may also be used to provide closed loop dwell control. Control unit 16 generates a respective EST signal for each cylinder based on a variety of available information. The control unit 16 can look at the current flag signal and fine tune its dwell control. For example, if the control unit 16 is planning to charge ignition coil 10 up to 10 amperes ($I_P$), then it may expect a certain amount of time to reach, say, 5 amperes (e.g., the charging trip level). The difference between the actual time and the expected time defines an error signal, which reflects variations in coil inductance, system voltage, coil resistance (which varies as a function of temperature), and the like. The control unit 16 may be configured to use this error signal to adjust its calculations for generating the EST signal (i.e., duration, start, stop, etc.). Dwell control is improved because it can be based on actual charge time of the coil (e.g., variables such as system voltage, coil inductance, resistance, change in temperature, etc.).

Figure 4A:
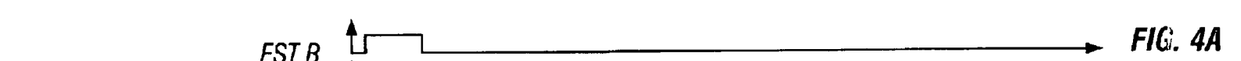
Figure 4B:
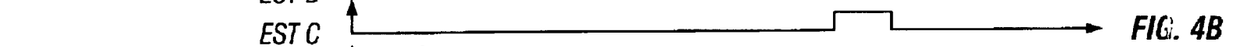
Figure 4C:
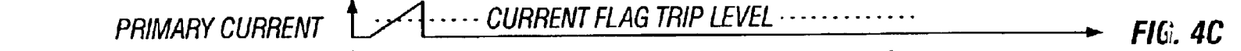
Figure 4D:
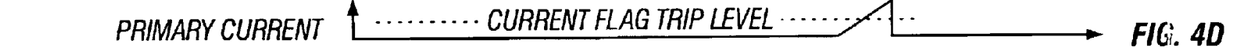
Figure 4E:
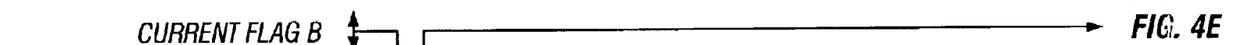
Figure 4F:
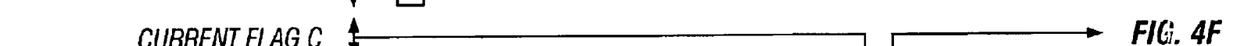
Figure 4G:
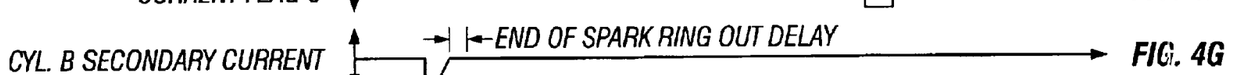
Figure 4H:
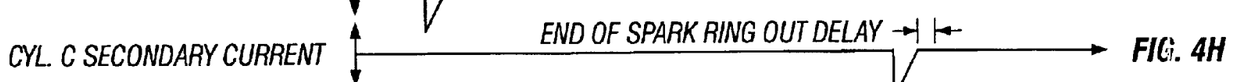
Figures 4I, 4J:
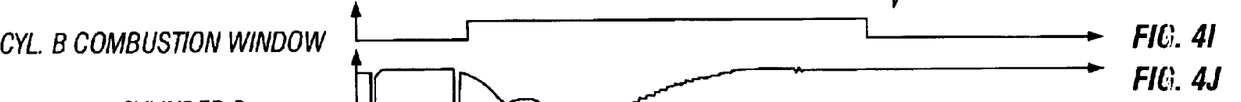
Figure 4K:
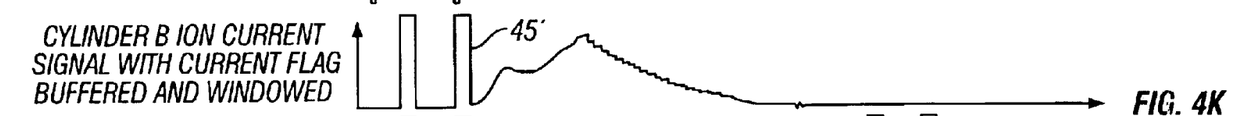

FIGS. 4A–4L show various timing diagrams for an alternate embodiment illustrating an alternate current flag signal 45. FIGS. 4A through 4L correspond to FIGS. 3A through 3L and accordingly, the description above also applies to FIGS. 4A through 4L. FIG. 4K shows the output of buffer and driver block 32 but with a modified current flag signal designated 45'. Modified current flag signal 45' comprises a pair of pulses. The first pulse is synchronized with the initial (falling) edge of the current flag signal for cylinder B in FIG. 4E. The second pulse is synchronized as follows: the rising edge is synchronized with the secondary current decaying to zero, while the falling edge of the second pulse is synchronized to the expiration of the end of spark ring out delay (or, in other words, the opening of the combustion determination window). In effect, the pair of pulses define an envelope which corresponds to the modified current flag signal 45 shown in FIGS. 3K and 3L.

Figure 4L:
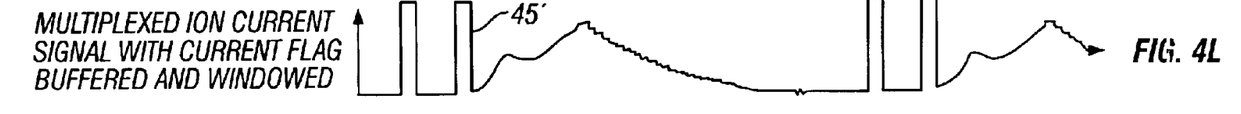

FIG. 4L shows the multiplexing of the combined ion current signal modified current flag signal from each of the ignition coils 10 associated with cylinder B and cylinder C.

Figure 5:
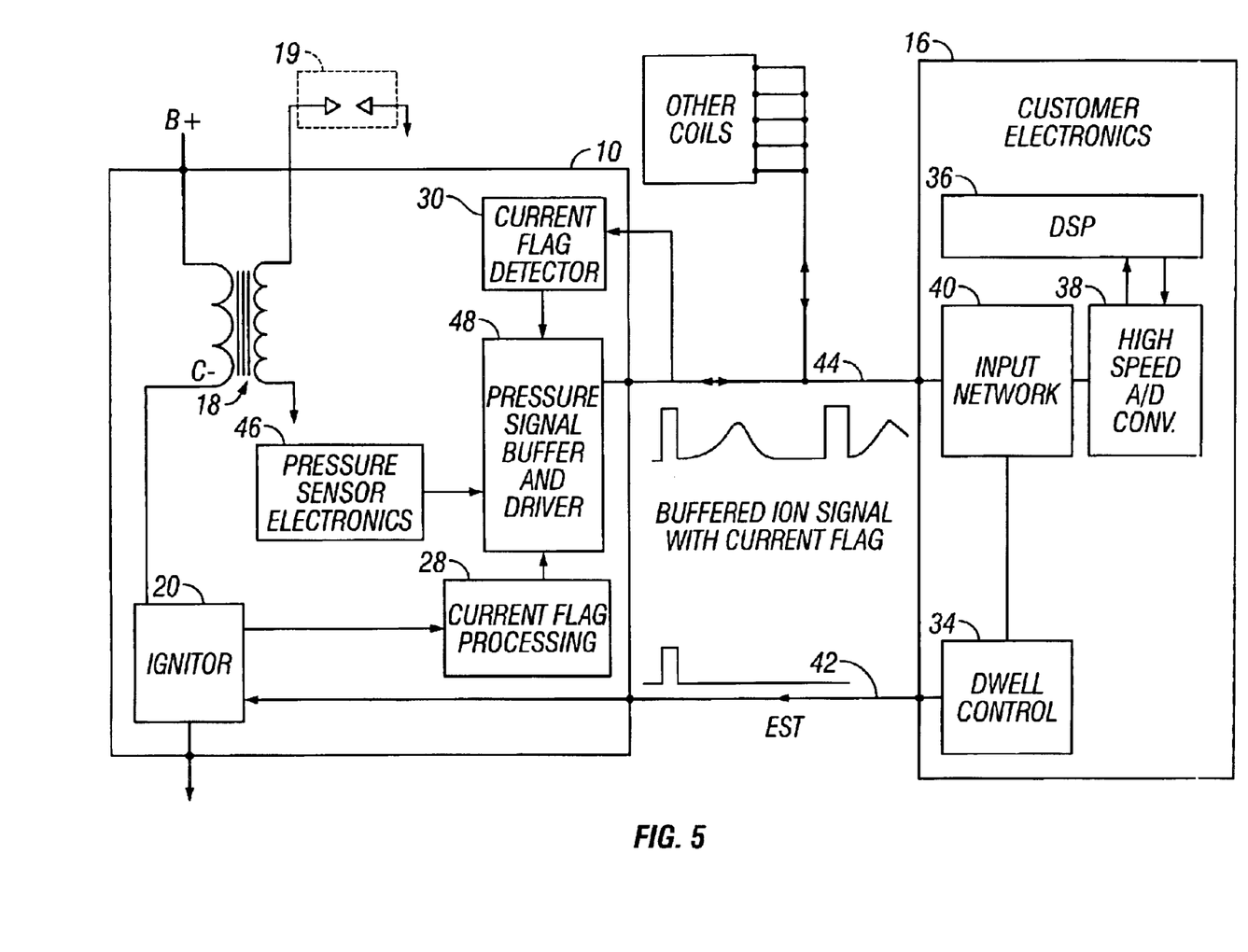
FIG. 5 is a simplified block diagram view showing, in greater detail, one of the ignition coils and control unit of FIG. 1, in a cylinder pressure signal embodiment.

FIG. 5 shows an alternate embodiment of the inventive ignition system incorporating a different combustion signal generation subsystem. In particular, ignition coil 10 in FIG. 5 includes cylinder pressure sensor electronics 46 and a pressure signal buffer and driver 48. In all other respects, the ignition coil 10 shown in FIG. 5 is the same as the ignition coil 10 in FIG. 2.

Pressure sensor electronics 46 is configured to detect a cylinder pressure in a cylinder of engine 12. The resulting pressure signal is indicative of the combustion in the cylinder. For example only, it is known to use piezoelectric sensors associated with a spark plug shell to detect the force being applied to the spark plug shell during combustion. Other approaches are within the spirit and scope of the present invention, including the use of a strain gage, as set forth in co-pending application Ser. No. 09/799,362 filed Mar. 5, 2001, Publication No. US2002/0121127 A1, assigned to the common assignee of the present invention, and hereby incorporated by reference. The cylinder pressure signal provides information as to the combustion occurring in the cylinder.

Buffer and driver block 48 is configured to generate the combustion signal (i.e., the cylinder pressure signal in the embodiment of FIG. 5) as provided by pressure sensor block 46 in timed relation with the current flag signal, as provided by current flag processing block 28, when enabled by detector block 30. Buffer and driver block 32 may comprise conventional components known to those of ordinary skill in the art to implement the described function.

Figure 6A:
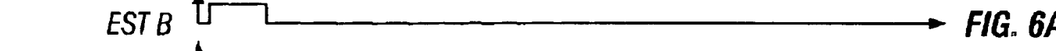
Figures 6B, 6C:
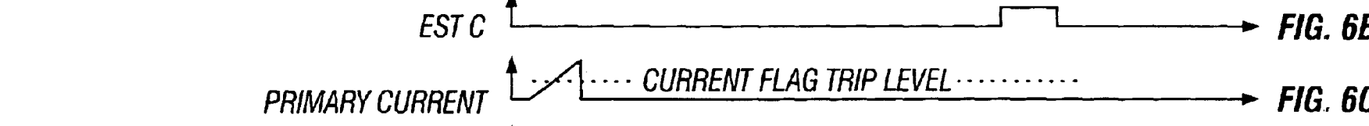
Figures 6D, 6E, 6F, 6G, 6H, 6I:
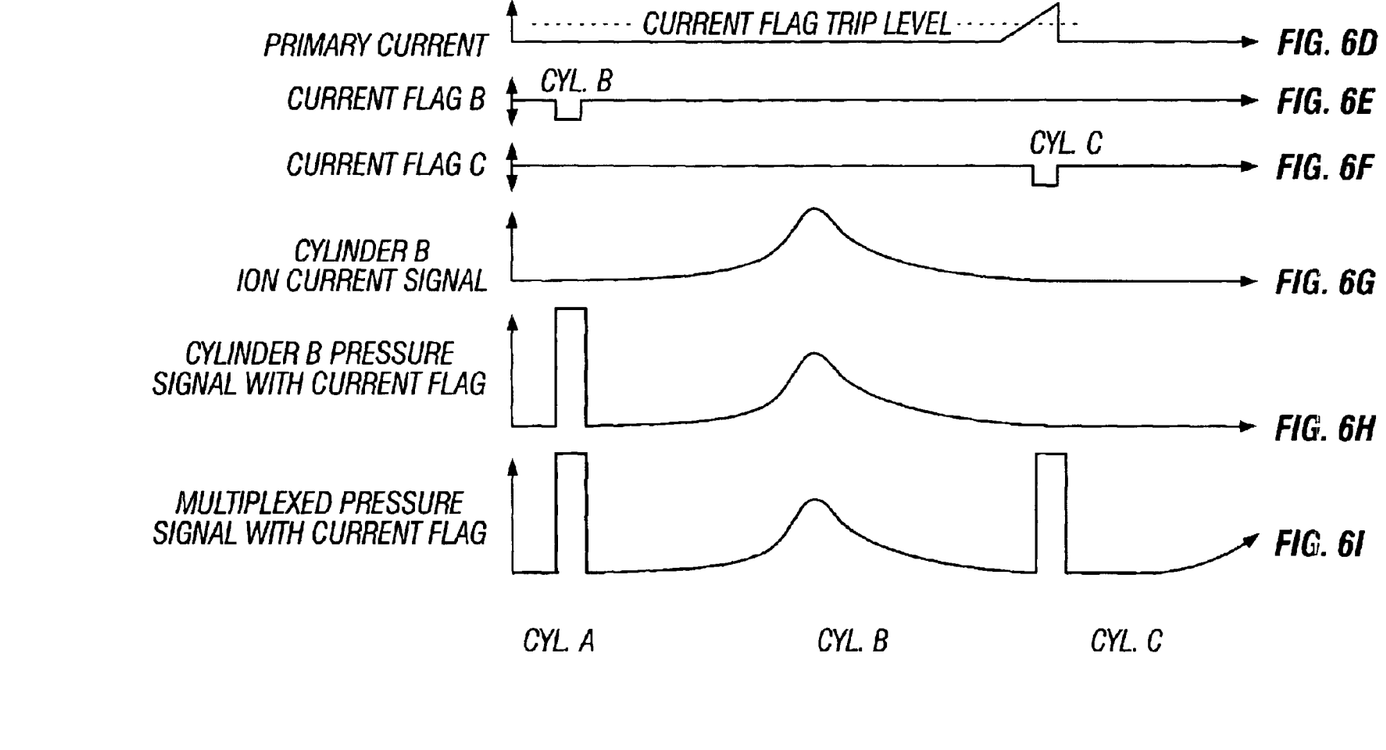

FIGS. 6A through 6I illustrate timing diagrams of various signals in, and output from, the ignition system of FIG. 5. FIGS. 6A and 6B show the electronic spark timing (EST) signals for the ignition coils 10 associated with cylinder B and cylinder C, respectively. FIGS. 6C and 6D illustrate the primary winding current that flows through the primary windings of the ignition coils 10 for cylinder B and cylinder C, respectively.

FIG. 6E shows the current flag signal for the cylinder B. FIG. 6F shows the current flag signal for the cylinder C. The current flag signal may be generated in the same manner as described above.

FIG. 6G shows a cylinder pressure signal associated with cylinder B. Note, the gradual rise of the cylinder pressure, as known when combustion is initiated and proceeds. The cylinder pressure signal for cylinder B is indicative of the combustion that is occurring in the cylinder. For example, the magnitude of the peak pressure may indicate the level of combustion. Other relationships between the cylinder pressure signal and the level and nature/quality of the combustion event are known to those of ordinary skill in the art.

FIG. 6H shows the cylinder pressure signal combined with a modified current flag signal (which in the illustrated embodiment is an inverted version of the current flag signal in FIG. 6E). This reflects the output of buffer and driver block 32.

FIG. 6I shows the activity appearing on common communication line 44. FIG. 6I shows the outputs from the ignition coils 10 associated with cylinder B and cylinder A.

It is to be understood that the above description is merely exemplary rather than limiting in nature, the invention being limited only by the appended claims. For example, the EST signal may be used in place of the current flag signal (original or in modified form) for the sync signal described herein. Various modifications and changes may be made thereto by one of ordinary skill in the art which embody the principles of the invention and fall within the spirit and scope thereof.

What is claimed is:

1. A method of operating a plurality of ignition coils in a multi-cylinder internal combustion engine comprising the steps of:
    (A) initiating combustion in a first cylinder using a first one of the ignition coils;
    (B) generating on a common communication line combined with a first sync signal a first combustion signal indicative of combustion in the first cylinder;
    (C) initiating combustion in a second cylinder using a second one of the ignition coils;
    (D) generating on said common communication line a second combustion signal associated with said second cylinder combined with a second sync signal to thereby multiplex said first and second combustion signals on said common communication line.

2. The method of claim 1 further including the steps of:
    generating a first current flag signal when a primary current through the first one of the ignition coils meets predetermined criteria; and
    producing said first sync signal in accordance with said first current flag signal.

3. The method of claim 2 further including the steps of:
    generating a second current flag signal when a primary current through the second one of the ignition coils meets predetermined criteria; and
    producing said second sync signal in accordance with said second current flag signal.

4. The method of claim 3 wherein the engine has a cylinder firing sequence associated therewith, the second ignition coil being associated with the second cylinder that is next in the firing sequence after the first cylinder.

5. The method of claim 3 wherein the predetermined criteria comprises a charging current trip level.

6. The method of claim 3 wherein said generating steps each comprise the substeps of:
    generating the respective current flag signal in a first state;
    transitioning the respective current flag signal from the first state to a second state along a first edge when the primary current increases to the charging current trip level; and
    returning the respective current flag signal from the second state to the first state along a second edge.

7. The method of claim 6 further comprising the step of electrically connecting a respective output from each one of the ignition coils for carrying respective current flag and combustion signals.

8. The method of claim 7 wherein said combustion signal is one selected from the group comprising an ion sense signal and a cylinder pressure signal.

9. The method of claim 1 further including the step of:

selecting the electronic spark timing (EST) signals for the first and second ignition coils as the first and second sync signals.

10. The method of claim 6 further including the step of:

producing the first sync signal as a pulse having a first edge synchronized to an initial edge of the first current flag signal, the pulse having a second edge synchronized with the end of an end-of-spark ring out delay.

11. The method of claim 6 further including the step of:

producing the first sync signal as a pair of pulses wherein a first one of the pulses has an edge synchronized to an initial edge of the first current flag signal, the other one of the pulses having a trailing edge synchronized with the end of an end-of-spark ring out delay.

12. A method of operating a plurality of ignition coils in a multi-cylinder internal combustion engine comprising the steps of:

(A) initiating combustion in a first cylinder using a first one of the ignition coils;

(B) generating a first current flag signal when a primary current through the first one of the ignition coils meets predetermined criteria;

(C) producing a first sync signal in accordance with said first current flag signal;

(D) generating, on a common communication line, a first combustion signal indicative of combustion in the first cylinder combined with the first sync signal;

(E) initiating combustion in a second cylinder using a second one of the ignition coils;

(F) generating a second current flag signal when a primary current through the second one of the ignition coils meets predetermined criteria;

(G) producing a second sync signal in accordance with said second current flag signal;

(H) generating, on said communication line, a second combustion signal associated with said second cylinder combined with a second sync signal to thereby multiplex said first and second combustions signals on said common communication line; and (I) processing the first and second combustion signals in sequence.

* * * * *